US008384319B2

(12) United States Patent
Marken et al.

(10) Patent No.: US 8,384,319 B2
(45) Date of Patent: Feb. 26, 2013

(54) SYSTEMS AND METHODS FOR CONTROLLING AN INERTIA OF A SYNCHRONOUS CONDENSER

(75) Inventors: Paul Edward Marken, Columbia City, IN (US); Daniel Robert Wallace, Fulton, NY (US)

(73) Assignee: General Electric Company, Schenectady, NY (US)

( * ) Notice: Subject to any disclaimer, the term of this patent is extended or adjusted under 35 U.S.C. 154(b) by 485 days.

(21) Appl. No.: 12/768,845

(22) Filed: Apr. 28, 2010

(65) Prior Publication Data

US 2011/0267013 A1 Nov. 3, 2011

(51) Int. Cl.
*H02P 1/00* (2006.01)
*H02P 3/00* (2006.01)
*H02P 3/20* (2006.01)
*H02P 5/00* (2006.01)

(52) U.S. Cl. .................. 318/280; 318/130; 320/100

(58) Field of Classification Search .................. 318/280, 318/130; 320/FOR. 100
See application file for complete search history.

(56) References Cited

U.S. PATENT DOCUMENTS

| 3,663,948 | A | | 5/1972 | Nagae et al. | |
|---|---|---|---|---|---|
| 6,093,975 | A | | 7/2000 | Peticolas | |
| 6,140,803 | A | * | 10/2000 | Hurley et al. | 322/29 |
| 6,288,456 | B1 | * | 9/2001 | Cratty | 307/64 |
| 6,559,559 | B2 | * | 5/2003 | Cratty | 307/64 |
| 6,611,068 | B2 | * | 8/2003 | Cratty | 307/64 |
| 6,670,721 | B2 | * | 12/2003 | Lof et al. | 290/44 |
| 2009/0096212 | A1 | | 4/2009 | Turner et al. | |

* cited by examiner

*Primary Examiner* — Walter Benson
*Assistant Examiner* — Erick Glass
(74) *Attorney, Agent, or Firm* — Sutherland Asbill & Brennan LLP

(57) ABSTRACT

Systems and methods for controlling an inertia of a synchronous condenser are described. An example system may include a motor, bidirectional power source, and at least one control device. The motor may be configured to alter a rotation of a condenser shaft to obtain a desired inertia of a synchronous condenser during a power disturbance event. The bidirectional power source may be coupled to the motor. The at least one control device may be configured to identify the power disturbance event, determine an amount of power to supply to or receive from the motor to obtain the desired inertia, and control the supply of power from the power source to the motor or from the motor to the power source based upon the determined amount of power.

20 Claims, 2 Drawing Sheets

SYSTEMS AND METHODS FOR CONTROLLING AN INERTIA OF A SYNCHRONOUS CONDENSER

FIELD OF THE INVENTION

Embodiments of the invention relate generally to synchronous condensers and more specifically to controlling an inertia of a synchronous condenser.

BACKGROUND OF THE INVENTION

Synchronous condensers are utilized in a wide variety of applications, such as power generation applications. For power generation applications, synchronous condensers are typically utilized to adjust electrical conditions on a local electric power distribution grid. A synchronous condenser is a specialized motor whose shaft is not attached to anything, but rather spins freely.

During a power disturbance event within a power generating system, the rotation of a synchronous condenser will typically fluctuate from a desired value. For example, a line fault within a power distribution grid will typically cause the synchronous condenser to slow down. These undesired fluctuations are typically greater for synchronous condensers utilized in conjunction with renewable power sources, such as wind turbines and photovoltaic cells. Synchronous condensers typically have a certain H value—a natural amount or duration of spinning inertia. However, there are practical limits to the H value of a synchronous condenser. Additionally, the use of flywheels is often not sufficient to increase the H value of a synchronous condenser to a desired value to accommodate various power disturbance events.

BRIEF DESCRIPTION OF THE INVENTION

Some or all of the above needs and/or problems may be addressed by certain embodiments of the invention. Embodiments of the invention may include systems and methods for controlling an inertia of a synchronous condenser. According to one embodiment of the invention, there is disclosed a system for controlling an inertia of a synchronous condenser. The system may include a motor, a bidirectional power source coupled to the motor, and at least one control device. The motor may be configured to alter a rotation of a condenser shaft to obtain a desired inertia of the synchronous condenser during a power disturbance event. The at least one control device may be configured to identify the power disturbance event and determine an amount of power to supply to or receive from the motor to obtain the desired inertia. Additionally, the at least one controller may be configured to control the supply of power from the power source to the motor or from the motor to the power source based upon the determined amount of power.

According to another embodiment of the invention, there is disclosed a method for controlling an inertia of a synchronous condenser. A motor may be provided that is configured to alter a rotation of a condenser shaft to obtain a desired inertia of the synchronous condenser during a power disturbance event. Additionally, a bi-direction power source may be provided that is configured to supply power to the motor or receive power from the motor. The power disturbance event may be identified by a controller that includes one or more computing devices. An amount of power to supply to the motor from the power source or to receive from the motor by the power source to obtain the desired inertia may be determined by the controller. Based upon the determined amount of power, the controller may control the supply of power from the power source to the motor or from the motor to the power source.

According to yet another embodiment of the invention, there is disclosed a method for controlling an inertia of a synchronous condenser. An operation of the synchronous condenser may be monitored by a controller including one or more computing devices to identify a power disturbance event associated with the synchronous condenser. An impact of the identified event may be determined by the controller. Based upon the determined impact, the controller may control operation of a motor coupled to a condenser shaft and configured to alter a rotation of the shaft to obtain a desired inertia of the synchronous condenser.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
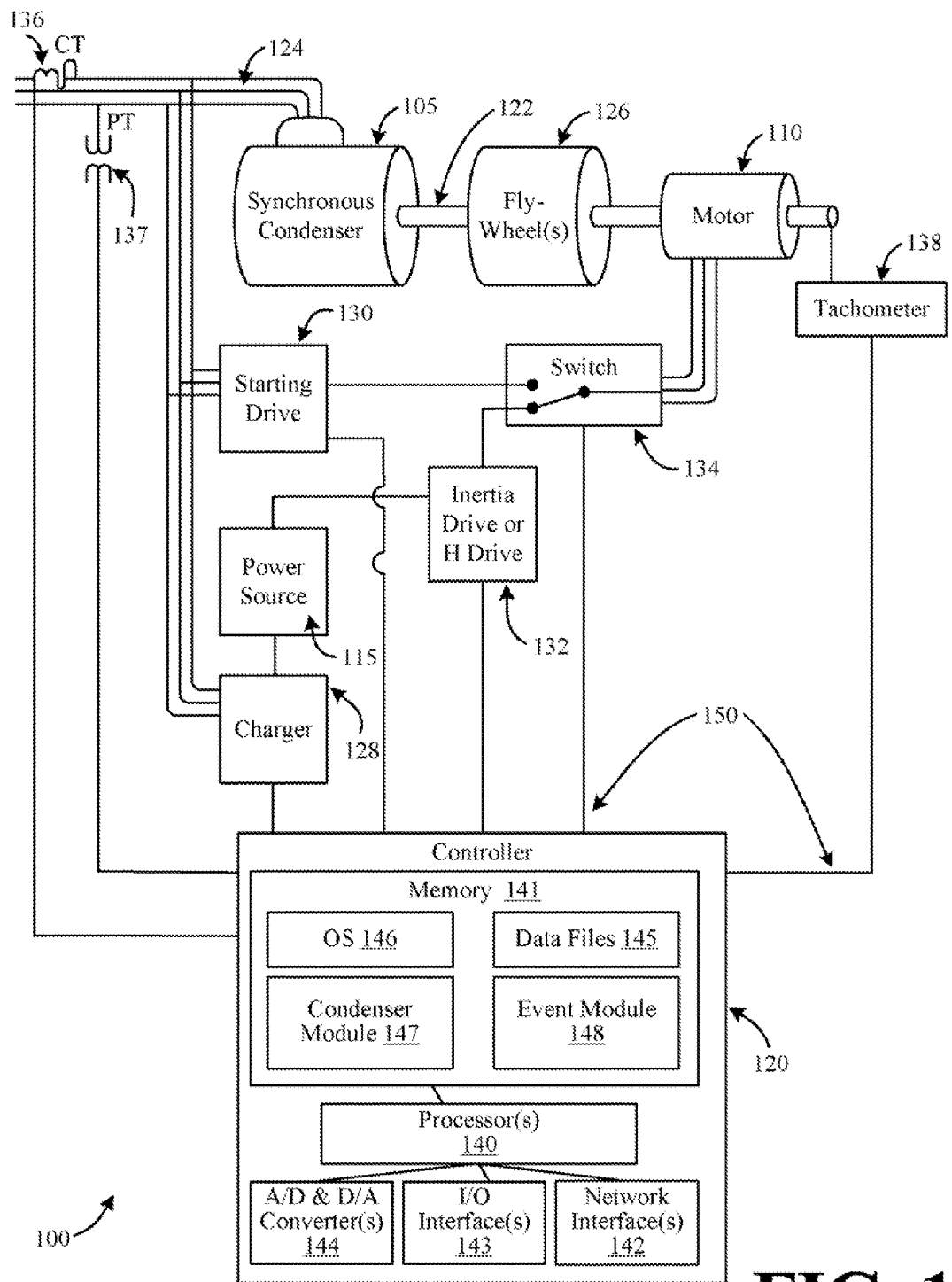

Having thus described the invention in general terms, reference will now be made to the accompanying drawings, which are not necessarily drawn to scale, and wherein:

FIG. 1 is a schematic diagram of one example system that may be utilized to control an inertia of a synchronous condenser, according to an illustrative embodiment of the invention.

Figure 2:
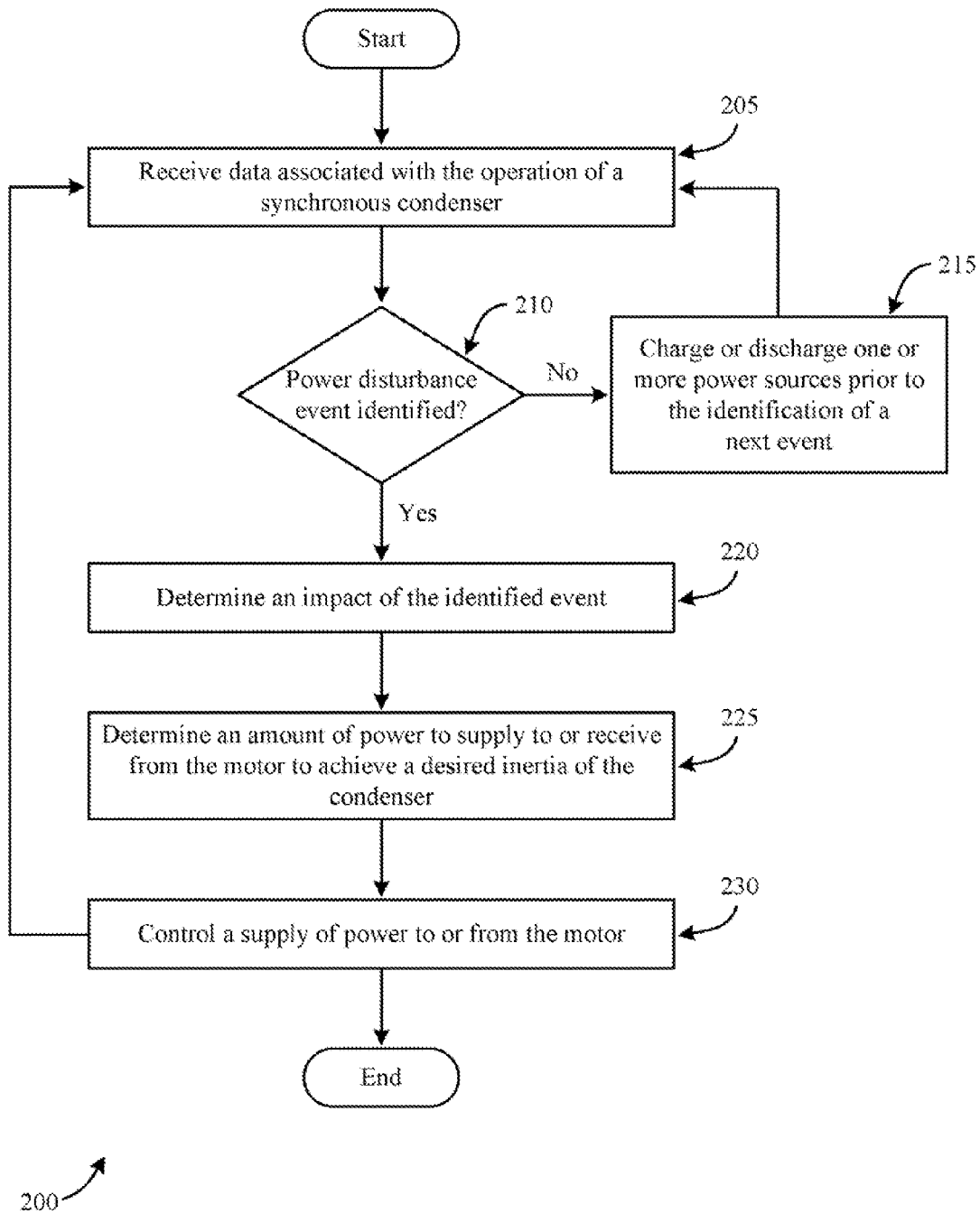

FIG. 2 is a flow chart of one example method for controlling an inertia of a synchronous condenser, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for controlling an inertia of a synchronous condenser. According to an example embodiment of the invention, a motor may be configured to alter a rotation of a condenser shaft associated with a synchronous condenser. In this regard, a desired inertia of the synchronous condenser may be achieved and/or maintained during a power disturbance event. A wide variety of suitable motors may be utilized as desired in various embodiments of the invention, such as an alternating current motor or a direct current motor. In certain embodiments, a bidirectional power source, such as a capacitor bank or a battery bank, may be coupled to the motor. The power source may be configured to supply power to the motor or to receive power from the motor during an identified disturbance event. Additionally, as desired, the power source may be charged by the motor and/or by a power line associated with the synchronous condenser prior to the identification of a power disturbance event.

In certain embodiments, a control device, such as a processor driven control device, may be configured to identify a power disturbance event. For example, a control device may receive measurements data from one or more sensors that are configured to monitor operation of the synchronous condenser, and the control device may identify a power disturbance event utilizing at least a portion of the received measurements data. A wide variety of sensors may be in communication with the control device as desired in various embodiments of the invention, such as one or more tachometers or speed transducers, one or more current transformers, and/or one or more potential transformers. As desired, the control device may determine or calculate an amount of power to supply to the motor from the power source or to receive from the motor by the power source in order to achieve a desired inertia during a power disturbance event. The control device may then control the supply of power from the power source to the motor or from the motor to the power source based upon the determination. In certain embodiments, the control device may include or otherwise be associated with one or more variable frequency drives ("VFD") and/or direct current ("DC") drives that facilitate control of the supply of power from the power source to the motor or from the motor to the power source.

Various embodiments of the invention may include one or more special purpose computers, systems, and/or particular machines that facilitate the control of an inertia of a synchronous condenser. A special purpose computer or particular machine may include a wide variety of different software modules as desired in various embodiments. As explained in greater detail below, in certain embodiments, these various software components may be utilized to identify a power disturbance event and control an inertia of a synchronous condenser utilizing one or more motors.

Certain embodiments of the invention described herein may have the technical effect of facilitating the control of an inertia of a synchronous condenser. Additionally, certain embodiments of the invention may have the technical effect of driving or otherwise controlling an inertia of a synchronous condenser utilizing one or more motors. In this regard, an inertia of a synchronous condenser may be controlled and/or maintained during a power disturbance event.

FIG. 1 is a schematic diagram of one example system 100 that may be utilized to control an inertia of a synchronous condenser, according to an illustrative embodiment of the invention. The system 100 may include a synchronous condenser 105, at least one motor 110, a power source 115, and a controller 120 or control device. The motor 110 may be configured to alter a spinning rotation of the synchronous condenser 105 during a power disturbance event. The controller 120 may be configured to identify a power disturbance event that may impact the synchronous condenser 105 and control a supply of power between the power source 115 and the motor 110 to achieve a desired inertia or spinning rotation of the synchronous condenser during the identified power disturbance event.

With reference to FIG. 1, the synchronous condenser 105, which may also be referred to as a synchronous compensator, may be a specialized synchronous motor whose shaft 122 is not attached to anything, but rather spins freely. The synchronous condenser 105 may facilitate the adjustment of electrical conditions on an electrical power distribution grid to which the condenser 105 is attached. As shown, the synchronous condenser 105 may be in communication with one or more electrical power lines 124, such as power lines utilized in association with power generating devices (e.g., gas turbines, wind turbines, steam turbines, photovoltaic cells, etc.) and/or other power lines connected to a suitable power distribution grid. In certain embodiments, the synchronous condenser 105 may either generate or absorb reactive power as needed to support the grid's voltage and/or to maintain a power factor of the grid at a specified level. A wide variety of suitable synchronous condensers may be utilized as desired in various embodiments of the invention. As desired, a synchronous condenser may be sized for a particular application.

The synchronous condenser 105 may have an inertia value or an H value. The H value may represent the natural inertia of the condenser 105. In other words, the H value may represent a time duration for which the synchronous condenser 105 will continue to rotate in the event of a power disturbance, such as a fluctuation in frequency, a downed power line, a line to line fault, a grid fault, or a transient event, that disrupts the power supplied to the synchronous condenser 105. In certain embodiments of the invention, one or more flywheels 126 may optionally be connected to the shaft 122 in order to increase the H value of the condenser 105 and/or to smooth out changes in the rotation of the condenser 105 and the shaft 122. Any number of flywheels 126 may be utilized as desired in various embodiments.

According to an aspect of the invention, the at least one motor 110 may be configured to rotate the shaft 122 and/or drive the condenser 105. Any number of motors may be provided as desired in various embodiments of the invention. As desired, a motor may be sized in accordance with the size or capacity of the synchronous condenser 105. Additionally, a wide variety of suitable types of motors may be utilized, such as any suitable alternating current ("AC") and/or direct current ("DC") motors. In one example embodiment, a three-phase AC motor may be utilized. As desired, the motor 110 may receive power from the power source 115 and utilize the received power to rotate or drive the shaft 122, thereby maintaining and/or alter an inertia of the synchronous condenser 105. Additionally, as desired, the motor 110 may be configured to draw power from the rotation of the shaft 122 and provide the power to the power source 115 and/or to another device, thereby maintaining and/or altering an inertia of the synchronous condenser 105. For example, the motor 110 may be utilized to apply a force to the shaft 122 in a first direction in order to maintain or alter an inertia of the synchronous condenser 105. As another example, a direction of the motor 110 power may be reversed, and the motor 110 may be utilized to apply a force to the shaft 122 in a second direction opposite to the first direction in order to maintain or decrease an inertia of the synchronous condenser 105.

In certain embodiments of the invention, the motor 110 may additionally be utilized to start the synchronous condenser 105 or assist in starting the condenser 105. During a startup of the synchronous condenser 105, the motor 110 may be utilized to rotate or drive the shaft 122 until the condenser 105 reaches a desired state or condition, such as a steady state condition. Once the condenser 105 reaches the desired state, the motor 110 may be allowed to freewheel until a power disturbance event is identified. Based upon the identification of a power disturbance event, the motor 110 may be utilized to control and/or maintain an inertia of the synchronous condenser 105.

With continued reference to FIG. 1, the power source 115 may include any number of suitable power sources that are configured to supply power to the motor 110 and/or to receive power from the motor 110. In certain embodiments, the power source 115 may be a bidirectional power source. Additionally, in certain embodiments, a first power source may be utilized to supply power to the motor 110, and a second power source may be utilized to receive power from the motor 110. A wide variety of suitable power sources may be utilized as desired in certain embodiments of the invention. Examples of suitable power sources include, but are not limited to, one or more capacitors, specialized capacitors, and/or capacitor banks, one or more batteries or battery banks, etc. The power source 115 may be configured to supply power to the motor 110 and/or receive power from the motor 110 during a power disturbance event. For example, a battery bank or capacitor bank may be utilized to supply power to the motor 110 during a power disturbance event that causes a decrease in grid frequency. As another example, a battery bank or capacitor bank may be utilized to receive power from the motor 110 during an identified disturbance event that causes an alteration in grid frequency. In this regard, the motor may be utilized to control and/or maintain an inertia of the synchronous condenser 105.

In certain embodiments, the power source 115 (e.g., batteries, capacitors, etc.) may be powered or charged by the motor 110 and/or the line 124 prior to the identification of a power disturbance event. For example, during a steady state operation of the condenser 105, the motor 110 may be utilized to provide power to the power source 115 in order to charge the power source 115. As another example, during a steady state operation of the condenser 105, one or more power lines 124 (e.g., grid line(s)) associated with the condenser 105 may be utilized to charge the power source 115. In other embodiments, a different source of power, such as a turbine or another motor, may be utilized to charge the power source 115 prior to the identification of a power disturbance event.

In certain embodiments, a charger 128 may be provided that is configured to charge and/or control the charging of the power source 115. For example, a charger 128 that includes an AC to DC component may be configured to receive power from the line 124 and charge the power source 115. As desired, a DC component of the charger 128 may be thyristor-based component, an insulated gate bipolar transistor-based ("IGBT") component, and/or any other suitable component. As such, the charger 128 may rectify a received AC signal in order to provide a DC signal to a DC power source 115. Additionally, as desired, the charger 128 may be configured to receive power from the power source 115 and supply at least a portion of the received power to the line 124. In this regard, the power source 115 may be utilized to maintain desirable conditions on the line 124 and/or power grid. As another example, the charger 128 may be configured to receive power from the motor 110 and charge the power source 115 in a similar manner. As yet another example, the charger 128 may be a separate source of power (e.g., another motor, a turbine, etc.) that is configured to charge the power source 115.

As desired in certain embodiments of the invention, one or more variable frequency drives ("VFD's") may be provided. For example, one or more VFD's may be provided in embodiments that include an AC motor. A VFD may be utilized to control the rotational speed of the motor 110 by controlling the frequency of the electrical power supplied to the motor 110 and/or pulled from the motor 110. In this regard, the VFD may control the output of the motor 110. As shown in FIG. 1, a first VFD may be provided as a starting drive 130, and a second VFD may be provided as an inertia drive 132 or an H drive. However, as desired, the two VFD's may be combined into a single VFD and/or additional VFD's may be utilized. Additionally, as desired, one or more of the VFD's 130, 132 may be incorporated into the controller 120 or integrated into a control device.

The starting drive 130 may be configured to control a supply of power to the motor 110 during a startup of the synchronous condenser 105. In certain embodiments, the starting drive 130 may provide power to the motor 110 from the electrical power line(s) 124 or from a power grid. In other embodiments, the starting drive 130 may provide power to the motor 110 from the power source 115. In this regard, the motor 110 may be utilized to assist in the rotation of the shaft 122 in order to start the condenser 105. Once the condenser 105 reaches a desired condition, such as a steady state condition, the starting drive 130 may be disconnected from the motor 110.

The inertia drive 132 may be configured to control a supply of power to or from the motor 110 during a power disturbance event. For example, during a power disturbance event that leads to a decrease in the rotation of the shaft 122, the inertia drive 132 may provide power to the motor 110 from the power source 115. As another example, during a power disturbance event that leads to an increase in the rotation of the shaft 122, the inertia drive 132 may pull power from the motor 110 and provide the power to the power source 115 and/or to other components of the system 100. In certain embodiments, an amount of power supplied to or pulled from the motor 110 by the inertia drive 132 may be based upon a determined and/or estimated impact of the power disturbance event. Additionally, as desired, the amount of power may be dynamically adjusted or varied by the inertia drive 132 during the power disturbance event. For example, the controller 120 may identify a power disturbance event and determine an impact of the identified event. The controller 120 may then direct the inertia drive 132 to provide power to or pull power from the motor 110 in order to control and/or maintain a desired inertia of the synchronous condenser 105. The controller 120 may continue to monitor the condenser 105 through the event and adjust the amount of power as desired.

As desired, one or more switches 134 may be utilized to switch between the VFD's and/or other power or current control devices that are connected to the motor 110. For example, as illustrated in FIG. 1, a switch 134 may be provided that is configured to switch a connection to the motor 110 between the starting drive 130 and the inertia drive 132. The switch 134 may be configured to connect the starting drive 130 to the motor 110 during a startup of the synchronous condenser 105. Once a desired condition, such as a steady state operating condition, is reached by the condenser 105, the switch 134 may be configured to disconnect the starting drive 130. The switch 134 may then either connect the inertia drive 132 to the motor 110 when the starting drive 130 is disconnected or when a power disturbance event is identified. In certain embodiments, the switch 134 may be a suitable mechanical, electromechanical, electrical switch. In other embodiments, the switch 134 may be a logical switch embodied in a computer program, computer-implemented instructions, and/or control logic.

In embodiments of the invention that include a DC motor, any number of suitable DC drives or DC control devices may be utilized to control an amount of power that is provided to the motor 110. These DC drive(s) may perform a similar function as the VFD's described above for use with AC motors.

Additionally, any number of sensors 136, 137, 138, sensing devices, and/or measurement devices may be provided. The sensors 136, 137, 138 may be configured to monitor and/or measure a wide variety of operating conditions and/or operating parameters associated with the synchronous condenser 105. As desired, the sensors 136, 137, 138 may further be configured to communicate or otherwise provide measurements data to the controller 120. As explained in greater detail below, the controller 120 may be configured to identify a power disturbance event utilizing at least a portion of the received measurements data. A wide variety of sensors may be utilized as desired in various embodiments of the invention. For example, one or more current transformers 136 and/or potential transformers 137 may be utilized to monitor conditions on the line 124 connected to the synchronous condenser 105. In this regard, current and/or voltage measurements may be made, and the measurements may be utilized to identify current and/or voltage changes within the line 124 and/or grid. As another example, one or more tachometers 138 or speed transducers may be utilized to monitor a rotation of the shaft 122. A tachometer 138 may be utilized to monitor a rotational velocity of the shaft 122, and the rotational velocity may be utilized to determine an AC line frequency and/or rate of frequency change associated with the condenser 105. In this regard, a spinning rotation and/or inertia of the synchronous condenser 105 and/or a frequency within the grid may be monitored.

With continued reference to FIG. 1, the system 100 may include a controller 120 or control device. In certain embodiments, the controller 120 may be a central controller associated with a power plant and/or power generation system. Some examples of suitable controllers are a Mark™ VI control system and a Mark™ VIe control system produced by the General Electric Company. The controller 120 may be configured to identify a power disturbance event and control the operation of one or more other components of the system 100 based upon the identification of a power disturbance event.

The controller 120 may include any number of suitable processor driven devices. For example, the controller 120 may include any number of special purpose computers or particular machines, application-specific circuits, programmable logic controllers ("PLC"), microcontrollers, personal computers, minicomputers, mainframe computers, supercomputers, and the like. In certain embodiments, the operations of the controller 120 may be controlled by computer-executed or computer-implemented instructions that are executed by one or more processors associated with the controller 120. The instructions may be embodied in one or more software components as desired in various embodiments of the invention. The execution of the instructions may form a special purpose computer or other particular machine that is operable to identify a power disturbance event and control the operation of other components of the system 100 based upon the identification. The one or more processors that control the operations of the controller 120 may be incorporated into the controller 120 and/or in communication with the controller 120 via one or more suitable networks. In certain embodiments of the invention, the operations and/or control of the controller 120 may be distributed among several processing components.

The controller 120 may include one or more processors 140, one or more memory devices 141, one or more network interface device(s) 142, one or more input/output ("I/O") interfaces 143, and/or one or more analog-to-digital ("A/D") and/or digital-to-analog ("D/A") converters 144. The one or more memory devices 141 may be any suitable memory devices, for example, caches, read only memory devices, random access memory devices, magnetic storage devices, etc. The one or more memory devices 141 may store data, executable instructions, and/or various program modules utilized by the controller 120, for example, data 145 associated with the operation of the condenser 105 and/or other components of the system 100, an operating system ("OS") 146, a condenser module 147, and an event module 148. The data 145 may include any suitable data associated with the operation of the synchronous condenser 105 (e.g., measurements data and/or event data associated with the condenser 105), the motor 110, the starting drive 130, the inertia drive 132, the power source 115, the switch 134, the charger 128, etc. The OS 146 may include executable instructions and/or program modules that facilitate and/or control the general operation of the controller 120. For example, the OS 146 may facilitate the execution of other software programs and/or program modules by the processors 140.

The condenser module 147 may be configured to control the general operation of the synchronous condenser 105. For example, the condenser module 147 may control the startup of the condenser 105. In doing so, the condenser module 147 may control the operation of the starting drive 130. Additionally, the condenser module 147 may monitor any number of operating characteristics of the condenser 105. For example, the condenser module 147 may receive measurements data from the various sensors 136, 137, 138 and utilize the received data to monitor various operating characteristics of the condenser 105 and/or the line 124, such as voltage characteristics, frequency characteristics, and/or current characteristics. In doing so, the condenser module 147 and/or the event module 148 may identify a power disturbance event. For example, a power disturbance event may be identified based upon changes in one or more operating characteristics of the condenser 105 and/or the line 124.

A wide variety of power disturbance events may be identified as desired in various embodiments of the invention, including but not limited to, events associated with fluctuations in line or grid frequency, downed lines, line to line faults, grid faults, voltage spikes, and/or various transient conditions. Certain power disturbance events may result in a decrease in grid frequency and/or a decrease in rotational velocity and/or inertia of the synchronous condenser 105. Other power disturbance events may result in an increase in grid frequency and/or an increase in rotational velocity and/or inertia of the synchronous condenser 105.

Once a power disturbance event has been identified, the event module 148 may be configured to take one or more appropriate control actions associated with the identified event. For example, the event module 148 may determine an impact and/or potential impact of the identified event on the line 124 (e.g., grid frequency) and/or the synchronous condenser 105 (e.g., an impact on the rotational velocity and/or inertia of the condenser 105). As desired, any number of measurements and/or predictive models may be utilized to determine an impact and/or potential impact of an identified power disturbance event. The event module 148 may additionally determine an amount of power that should be supplied by the motor 110 and/or received from the motor in order to maintain the inertia of the condenser 105 at a desired level or adjust the inertia of the condenser 105 to a desired level. For example, the event module 148 may determine an amount of power to supply to the motor 110 from the power source 115 in order to rotate the shaft 122 to maintain or alter the inertia of the synchronous condenser 105. As another example, the event module 148 may determine an amount of power to pull from the shaft 122 by the motor 110 in order to slow the rotation of the shaft 122, thereby resulting in the maintenance or alteration in the inertia of the condenser 105. In this regard, the rotational velocity and/or inertia of the condenser 105 may be controlled in response to an identified power disturbance event and/or throughout the event in order to enhance the stability of the line 124 and/or power grid.

With continued reference to FIG. 1, the network interface devices 142 may facilitate connection of the controller 120 to any number of suitable networks, such as a local area network, a wide area network, the Internet, a radio frequency ("RF") network, a Bluetooth™ enabled network (trademark owned by BLUETOOTH SIG, INC.), any suitable wired network, any suitable wireless network, or any suitable combination of wired and wireless networks. In this regard, the controller 120 may communicate with other components of the system 100 and/or with external devices or systems. The I/O interfaces 143 may facilitate communication between the controller 120 and one or more input/output devices, for example, one or more user interface devices, such as a display, keypad, control panel, touch screen display, remote control, microphone, etc., that facilitate user interaction with the controller 120. Additionally, the A/D and/or D/A converters 144 may facilitate the receipt of the data from and/or the communication of commands and/or data to other components of the system 100, such as the sensors 136, 137, 138. For example, analog data may be received from the sensors 136, 137, 138, and processed by a suitable A/D converter in order to generate digital data that may be further processed by the controller 120. As another example, digital commands of the controller 120 may be processed by a suitable D/A converter prior to communicating the commands to one or more recipient analog devices. As desired, any number of suitable connections 150 may facilitate communications between the controller 120 and other components of the system 100, such as the sensors 136, 137, 138. A wide variety of different types of suitable connections may be utilized to facilitate communication, for example, direct network connections, local area network connections, wide area network connections, Internet connections, Bluetooth™ enabled connections (trademark owned by BLUETOOTH SIG, INC.), radio frequency network connections, cellular network connections, any suitable wired connections, any suitable wireless connections, and/or any suitable combinations of connections.

As desired, embodiments of the invention may include a system 100 with more or less than the components illustrated in FIG. 1. The system 100 of FIG. 1 is provided by way of example only.

FIG. 2 is a flow chart of one example method 200 for controlling an inertia of a synchronous condenser, according to an illustrative embodiment of the invention. The method 200 may be performed by a suitable controller associated with a synchronous condenser, such as the controller 120 associated with the synchronous condenser 105 of FIG. 1. The method 200 may begin at block 205.

At block 205, data associated with the operation of the synchronous condenser 105 may be received. For example, measurements data associated with the operation of the synchronous condenser 105 and one or more power lines or a power grid associated with the condenser 105, such as the line 124 illustrated in FIG. 1, may be received. In certain embodiments, data may be received from one or more suitable sensors that are configured to monitor the condenser 105 and/or the line 124, such as the sensors 136, 137, 138 illustrated in FIG. 1. For example, measurements data may be received from a current transformer, a potential transformer, and/or a tachometer.

At block 210, a determination may be made as to whether a power disturbance event is identified. For example, at least a portion of the received data may be analyzed in order to determine whether a power disturbance event is taking place. As set forth in greater detail above, a wide variety of different types of power disturbance events may be identified as desired in various embodiments of the invention. For example, a power disturbance event that affects frequency within the power grid and/or condenser may be identified. As another example, a power disturbance event that affects the rotational velocity and/or inertia of the synchronous condenser 105 may be identified. If it is determined at block 210 that a power disturbance event is not identified or that a power disturbance even is no longer identified, then operations may continue at block 215. At block 215, one or more power sources, such as the power source 115 illustrated in FIG. 1, may be charged or discharged prior to the identification of a subsequent or next power disturbance event. For example, one or more batteries and/or capacitors may be charged prior to the identification of a subsequent power disturbance event. As another example, one or more batteries or capacitors may be discharged or partially discharged prior to a subsequent power disturbance event such that power may be provided to the batteries or capacitors. As desired, a first power source may be charged and a second power source may be discharged. Operations may then continue at block 205.

If, however, it is determined at block 210 that a power disturbance event is identified, then operations may continue at block 220. At block 220, an impact or potential impact of the identified power disturbance event may be determined or calculated. In certain embodiments, at least a portion of the received data may be utilized to determine an impact or potential impact of the power disturbance event. For example, a change in grid frequency or a change in voltage may be utilized in the determination of an impact or a potential impact.

At block 225, an amount of power that should be supplied by a motor, such as the motor 110 illustrated in FIG. 1, or received from the motor 110 in order to achieve a desired inertia of the synchronous condenser 105 may be determined or calculated. In certain embodiments, the determination of the amount of power may be based at least in part upon the impact or potential impact. For example, a determination may be made as to an amount of power to supply to the motor 110 from the power source 115 in order to rotate a shaft associated with the condenser 105, such as the shaft 122 shown in FIG. 1, to maintain or alter the inertia of the synchronous condenser 105. As another example, a determination may be made as to an amount of power to pull from the shaft 122 by the motor 110 in order to decrease or slow the rotation of the shaft 122, thereby resulting in the maintenance and/or controlled alteration of the inertia of the condenser 105. The determined amount of power may be an amount of power that will control the rotational velocity and/or inertia of the synchronous condenser 105 through the identified power disturbance event and/or after the event in order to maintain relatively stable conditions within a power system or power grid.

At block 230, a supply of power to or from the motor 110 may be controlled based at least in part upon the determined amount of power. For example, power may be supplied to the motor 110 from the power source 115 in order to rotate the shaft 122. As another example, power may be pulled from or drawn from the motor 110 and, as desired, supplied to the power source 115 in order to slow the rotation of the shaft 122. In this regard, the rotational velocity and/or inertia of the condenser 105 may be controlled in response to the identified power disturbance event and/or throughout the event in order to enhance the stability of the power system or grid. Operations may then continue at block 205.

As desired, the operating characteristics of the condenser 105 and/or the line 124 or grid may be continually monitored while the condenser 105 is in operation. Accordingly, FIG. 2 is illustrated as a loop in which the condenser 105 is continually monitored for power disturbance events.

The operations described in the method 200 of FIG. 2 do not necessarily have to be performed in the order set forth in FIG. 2, but instead may be performed in any suitable order. Additionally, in certain embodiments of the invention, more or less than all of the elements or operations set forth in FIG. 2 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for controlling an inertia of a synchronous condenser, the system comprising:
    a motor configured to alter a rotation of a condenser shaft to obtain a desired inertia of the synchronous condenser during a power disturbance event;
    a bidirectional power source coupled to the motor; and
    at least one control device configured to (i) identify the power disturbance event, (ii) determine an amount of power to supply to or receive from the motor to obtain the desired inertia, and (iii) control the supply of power from the power source to the motor or from the motor to the power source based upon the determined amount of power.

2. The system of claim 1, wherein the at least one control device is further configured to:
    determine an impact of the identified event; and
    determine the amount of power based at least in part on the determined impact.

3. The system of claim 1, wherein the motor comprises one of an alternating current motor or a direct current motor.

4. The system of claim 1, wherein the at least one control device comprises at least one of a variable frequency drive or a direct current drive configured to control the supply of power from the power source to the motor or from the motor to the power source.

5. The system of claim 4, wherein the variable frequency drive or direct current drive comprises a first variable frequency drive or a first direct current drive, and further comprising:
    a second variable frequency drive or a second direct current drive configured to control the supply of power to the motor during start-up of the synchronous condenser.

6. The system of claim 1, wherein the power source comprises at least one of (i) one or more capacitors or (ii) one or more batteries.

7. The system of claim 1, wherein the power source is charged, prior to the identification of the power disturbance event, by at least one of (i) the motor or (ii) a power line associated with the synchronous condenser.

8. The system of claim 1, further comprising:
    one or more sensors configured to monitor operation of the synchronous condenser,
    wherein the at least one control device is further configured to receive measurements data from the one or more sensors and identify the power disturbance event based at least in part on a portion of the received measurements data.

9. The system of claim 8, wherein the one or more sensors comprise at least one of (i) a tachometer, (ii) a current transformer, or (iii) a potential transformer.

10. The system of claim 1, further comprising:
    one or more flywheels connected to the condenser shaft.

11. A method for controlling an inertia of a synchronous condenser, the method comprising:
    providing a motor configured to alter a rotation of a condenser shaft to obtain a desired inertia of the synchronous condenser during a power disturbance event;
    providing a bidirectional power source configured to supply power to the motor or receive power from the motor;
    identifying, by a controller comprising one or more computing devices, the power disturbance event;

determining, by the controller, an amount of power to supply to the motor from the power source or to receive from the motor by the power source to obtain the desired inertia; and controlling, by the controller based upon the determined amount of power, the supply of power from the power source to the motor or from the motor to the power source.

12. The method of claim 11, further comprising:
determining, by the controller, an impact of the identified event,
wherein determining an amount of power comprises determining the amount of power based at least in part on the determined impact.

13. The method of claim 11, wherein providing a motor comprises providing one of an alternating current motor or a direct current motor.

14. The method of claim 11, wherein controlling the supply of power comprises controlling the supply of power utilizing at least one of a variable frequency drive or a direct current drive.

15. The method of claim 11, wherein providing a power source comprises providing at least one of (i) one or more capacitors or (ii) one or more batteries.

16. The method of claim 11, further comprising:
charging, prior to the identification of the power disturbance event, the power source by at least one of (i) the motor or (ii) a power line associated with the synchronous condenser.

17. The method of claim 11, further comprising:
receiving, by the controller from one or more sensors, measurements data associated with operation of the synchronous condenser,
wherein identifying a disturbance event comprises identifying the disturbance event based at least in part on a portion of the received measurements data.

18. The method of claim 17, wherein receiving measurements data comprises receiving measurements data from at least one of (i) a tachometer, (ii) a current transformer, or (iii) a potential transformer.

19. The method of claim 11, further comprising:
providing one or more flywheels that are connected to the condenser shaft.

20. A method for controlling an inertia of a synchronous condenser, the method comprising:
monitoring, by a controller comprising one or more computing devices, operation of the synchronous condenser to identify a power disturbance event associated with the synchronous condenser;
determining, by the controller, an impact of the identified event; and
controlling, by the controller based upon the determined impact, operation of a motor coupled to a condenser shaft and configured to alter a rotation of the shaft to obtain a desired inertia of the synchronous condenser.

* * * * *